United States Patent
Yamamoto

(10) Patent No.: US 8,518,307 B2
(45) Date of Patent: Aug. 27, 2013

(54) METHOD FOR PRODUCING YTTERBIUM PHOSPHATE FINE PARTICLES

(75) Inventor: Tetsushi Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/846,167

(22) Filed: Jul. 29, 2010

(65) Prior Publication Data

US 2011/0024926 A1   Feb. 3, 2011

(30) Foreign Application Priority Data

Jul. 31, 2009 (JP) .................................. 2009-179635

(51) Int. Cl.
*G02B 5/20* (2006.01)
(52) U.S. Cl.
USPC .............. 264/1.22; 252/301.4 P; 252/301.4 R
(58) Field of Classification Search
USPC .................. 264/1.22; 252/301.4 P, 301.4 R, 252/301.4 F, 301.4 H
See application file for complete search history.

(56) References Cited

U.S. PATENT DOCUMENTS

| 2,932,553 | A | * | 4/1960 | Didtschenko | 423/252 |
| 5,911,921 | A | * | 6/1999 | Takai et al. | 252/584 |
| 2002/0043647 | A1 | * | 4/2002 | Oshima et al. | 252/301.16 |
| 2003/0032192 | A1 | * | 2/2003 | Haubold et al. | 436/56 |

FOREIGN PATENT DOCUMENTS

JP  08-209110 A   8/1996

OTHER PUBLICATIONS

O.Lehmann, et al. Synthesis, Growth, and Ex3+ Luminescence of Lanthanide Phosphate Nanoparticles, J.Phys. Chem.B 107 p. 7449-7453, 2003, US.

* cited by examiner

*Primary Examiner* — Galen Hauth
(74) *Attorney, Agent, or Firm* — Canon U.S.A., Inc., IP Division

(57) ABSTRACT

A method for producing ytterbium phosphate fine particles includes adding phosphoric acid and water to an anhydrous ytterbium halide to cause a reaction between the anhydrous ytterbium halide and the phosphoric acid.

12 Claims, No Drawings

METHOD FOR PRODUCING YTTERBIUM PHOSPHATE FINE PARTICLES

BACKGROUND OF THE INVENTION

1. Field of the Invention

The present invention relates to a method for producing ytterbium phosphate fine particles.

2. Description of the Related Art

Ytterbium phosphate (YbPO$_4$) absorbs light in the infrared region but does not absorb light in the visible light region (Japanese Patent Laid-Open No. 08-209110). Ytterbium phosphate has a certain refractive index in the visible light region. For example, refractive indices ($n_o d$ and $n_e d$) and Abbe numbers ($v_o d$ and $v_e d$) of ytterbium phosphate in terms of ordinary ray and extraordinary ray with the d line ($\lambda = 587.6$ nm) are as follows.

$$n_o d = 1.676, n_e d = 1.853$$

$$v_o d = 66, v_e d = 78$$

These optical constants show that ytterbium phosphate has high refractive indices and high Abbe numbers. That is, ytterbium phosphate does not absorb light in the visible light region and can be used as a high-refractive-index low-dispersion material.

Accordingly, an organic-inorganic composite material including nanoparticles of ytterbium phosphate can be used for forming a colorless transparent optical lens having a high refractive index and a low dispersion. Such nanoparticles of ytterbium phosphate can be made to have a crystallite size of 10 nm or less. When an inorganic material having a crystallite size of more than 10 nm is used, light scattering is increased due to the difference in refractive index between the inorganic material and an organic material and haze may be increased.

A sol-gel process employing an ytterbium alkoxide as a raw material has been used as a method for producing ytterbium phosphate (YbPO$_4$) fine particles (Japanese Patent Laid-Open No. 08-209110).

A nonaqueous reaction is also known in which an ytterbium trichloride hydrate is used as a raw material, water is removed from the hydrate in an ether solvent, and the resultant ytterbium trichloride reacts with phosphoric acid (O. Lehmann et al., J. Phys. Chem. B, vol. 107, p7449 to 7453 (2003)).

SUMMARY OF THE INVENTION

In the case of using nanoparticles having a crystallite size of 10 nm or less as described above, as the particle diameter decreases, the optical band gap increases due to the effect of the size of nanometer order. As a result, such nanoparticles exhibit optical characteristics different from those of bulk members. Accordingly, to control optical characteristics of such nanoparticles, the nanoparticles are produced while the particle diameter is controlled on the order of nanometers.

However, according to the method for producing particles described in Japanese Patent Laid-Open No. 08-209110, ytterbium phosphate fine particles having a crystallite size of about 70 to 480 nm are produced. Such fine particles cannot be used as a material for forming colorless transparent optical lenses.

According to the production method described in O. Lehmann et al., J. Phys. Chem. B, vol. 107, p7449 to 7453 (2003), colorless transparent fine particles having a crystallite size of about 5 nm are produced. However, the diameter of the produced fine particles cannot be controlled.

The present invention provides a novel method for producing ytterbium phosphate fine particles having a crystallite size in the range of 10 nm or less on the order of nanometers. This method allows efficient production of such fine particles having desired crystallite sizes.

A method for producing ytterbium phosphate fine particles according to a first aspect of the present invention includes adding phosphoric acid and water to an anhydrous ytterbium halide to cause a reaction between the anhydrous ytterbium halide and the phosphoric acid.

A method for producing ytterbium phosphate fine particles according to a second aspect of the present invention includes mixing and heating a mixture solution of anhydrous ytterbium trichloride in tris(2-ethylhexyl)phosphate and a mixture solution of phosphoric acid, water, and trioctylamine in tris(2-ethylhexyl)phosphate to cause a reaction between the anhydrous ytterbium trichloride and the phosphoric acid.

A method for producing ytterbium phosphate fine particles having a crystallite size of 3 nm or more and 10 nm or less according to a third aspect of the present invention includes adding phosphoric acid and water to an anhydrous ytterbium halide, wherein a molar ratio of the water to the anhydrous ytterbium halide is 1 or more and 20 or less.

A method for adjusting a crystallite size of ytterbium phosphate fine particles according to a fourth aspect of the present invention includes adding phosphoric acid and water to an anhydrous ytterbium halide, wherein a crystallite size of ytterbium phosphate fine particles is adjusted by changing an amount of the water added with respect to the anhydrous ytterbium halide.

In a method for producing ytterbium phosphate fine particles according to the present invention, water is present in the reaction system and, by changing the amount of the water added with respect to an anhydrous ytterbium halide serving as a starting material, the crystallite size of ytterbium phosphate fine particles can be controlled in the range of 10 nm or less and on the order of nanometers.

Further features of the present invention will become apparent from the following description of exemplary embodiments.

DESCRIPTION OF THE EMBODIMENTS

Embodiments of the present invention will be described.

First Embodiment

Method for Producing Ytterbium Phosphate Fine Particles

The first embodiment relates to a method for producing ytterbium phosphate fine particles by causing a reaction between an anhydrous ytterbium halide and phosphoric acid. Hereafter, a case where the halide is a chloride will be described.

Ytterbium phosphate (YbPO$_4$) is generated from ytterbium chloride (YbCl$_3$) and phosphoric acid (H$_3$PO$_4$) by a reaction represented by the following formula (Formula (1)).

$$YbCl_3 + H_3PO_4 \rightarrow YbPO_4 + 3HCl \tag{1}$$

The inventor of the present invention has found that, according to the first embodiment, by causing this reaction in the presence of water, ytterbium phosphate fine particles having various crystallite sizes in the range of 10 nm or less and on the order of nanometers can be produced.

Specifically, the inventor of the present invention has found that the crystallite size of the resultant fine particles is changed by changing the molar ratio of water to an anhydrous ytterbium halide in the reaction system, that is, the amount of water added with respect to an anhydrous ytterbium halide. The higher the molar ratio of water to an anhydrous ytterbium halide in the reaction system is, the larger the crystallite size of the resultant fine particles becomes. In summary, in the first embodiment, the crystallite size can be controlled by controlling the amount of water added with respect to the amount of an anhydrous ytterbium halide.

Existing methods for producing ytterbium phosphate fine particles by causing a reaction between an anhydrous ytterbium halide and phosphoric acid have employed only non-aqueous reactions such as that described in O. Lehmann et al., J. Phys. Chem. B, vol. 107, p7449 to 7453 (2003). The production method described in this document employs an ytterbium halide hydrate and includes a step of removing water from the hydrate prior to the reaction. Thus, according to this method, a reaction system in which water is intentionally removed is prepared. The inventor of the present invention has recognized that fine particles can be produced by such a nonaqueous reaction; however, the crystallite size of the resultant fine particles cannot be controlled by the reaction. Then, the inventor has performed thorough studies. As a result, the inventor has found that fine particles having a crystallite size in the range of 10 nm or less and on the order of nanometers can be produced even when a reaction between an anhydrous ytterbium halide and phosphoric acid is caused intentionally in a reaction system including water. Additionally, the inventor has also found that, by changing the amount of water added, the crystallite size of the resultant fine particles is changed. Thus, the inventor has accomplished the present invention on the basis of a concept that is absolutely opposite to the concepts of existing techniques.

In the reaction represented by Formula (1), the following elementary processes probably occur (Formulae (2), (3), and (4)).

$$YbCl_3 \rightarrow Yb^{3+} + 3Cl^- \qquad (2)$$

$$H_3PO_4 \rightarrow 3H^+ + PO_4^{3-} \qquad (3)$$

$$Yb^{3+} + PO_4^{3-} \rightarrow YbPO_4 \qquad (4)$$

Here, in the process of $H_3PO_4 \rightarrow 3H^+ + PO_4^{3-}$ (Formula (3)), $H_3PO_4$ probably reacts with $H_2O$ to turn into $H_2PO_4^- \rightarrow HPO_4^{2-} \rightarrow PO_4^{3-}$ as in the following reaction formulae (Formulae (5), (6), and (7)).

$$H_3PO_4 + H_2O \rightarrow H_2PO_4^- + H_3O^+ \qquad (5)$$

$$H_2PO_4^- + H_2O \rightarrow HPO_4^{2-} + H_3O^+ \qquad (6)$$

$$HPO_4^{2-} + H_2O \rightarrow PO_4^{3-} + H_3O^+ \qquad (7)$$

These formulae show that, as the amount of $H_2O$ increases, the amount of $PO_4^{3-}$ generated increases. This promotes the process of $Yb^{3+} + PO_4^{3-} \rightarrow YbPO_4$ and the crystal growth rate of $YbPO_4$ increases. As a result, the diameter of $YbPO_4$ particles probably increases. In summary, by changing the amount of water, the amount of $PO_4^{3-}$ generated can be controlled and the process of $Yb^{3+} + PO_4^{3-} \rightarrow YbPO_4$ can be controlled. This probably allows production of $YbPO_4$ particles having desired diameters of nanometer order. For example, fine particles having a crystallite size selected from the range of 3 to 10 nm can be produced.

In the first embodiment, addition of phosphoric acid may be performed after water is added to the anhydrous ytterbium halide; or, alternatively, water may be added to the anhydrous ytterbium halide after phosphoric acid is added to the anhydrous ytterbium halide. Alternatively, a mixture of phosphoric acid and water can be added to an anhydrous ytterbium halide. In this case, by mixing phosphoric acid and water to cause the processes represented by Formulae (5) to (7) above and to generate $PO_4^{3-}$, the process represented by Formula (4) above can proceed rapidly.

The molar ratio of water to an anhydrous ytterbium halide in the reaction system can be 1 or more and 20 or less. When the molar ratio is less than 1, $PO_4^{3-}$ is less likely to be generated and the crystallization rate of $YbPO_4$ decreases. As a result, the crystallite size may be less than 3 nm and crystallization may be insufficient. When very fine particles having a crystallite size of less than 3 nm are produced, the surface area of the particles is large and the occupied volume proportion of a surface modifying agent used for suppressing agglomeration of the particles is large. As a result, optical characteristics of the surface modifying agent highly influence optical characteristics of organic-inorganic composite materials. When the molar ratio is more than 20, the crystallization rate of $YbPO_4$ increases and the crystallite size may be more than 10 nm.

In the present invention, a crystallite size can be calculated with the Debye-Scherrer formula from an X-ray diffraction peak measured by powder X-ray diffractometry (XRD). In XRD measurements performed in Examples of the present invention, an X-ray diffractometer (Product name: RINT 2100, manufactured by Rigaku Corporation) was used. The crystallite size $D_{(200)}$ of xenotime ytterbium phosphate at the (200) plane was calculated from an obtained X-ray diffraction peak ($2\theta = 26.1°$) with the Debye-Scherrer formula described below (Formula (8)). For processing X-ray diffraction data and calculating a crystallite size, a powder X-ray diffraction pattern integrated analysis software (trade name: JADE, manufactured by Rigaku Corporation) was used.

$$D_{(200)} = K^* \lambda_{Cu\text{-}K\alpha1} / \beta_{(200)} \cos\theta \qquad (8)$$

In Formula (8), $K = 0.9$; $\lambda_{Cu\text{-}K\alpha1} = 0.154056$ nm; and $\beta_{(200)}$ represents the half-width of the diffraction peak ($2\theta = 26.1°$).

In the anhydrous ytterbium halide ($YbX_3$) used in the first embodiment, X may be fluorine, chlorine, bromine, or iodine. Specifically, such an ytterbium halide may be ytterbium trifluoride, ytterbium trichloride, ytterbium tribromide, or ytterbium triiodide.

A method for producing ytterbium phosphate fine particles according to the first embodiment will be described. A first mixture solution in which an anhydrous ytterbium halide has been dissolved in a solvent and a second mixture solution in which phosphoric acid has been dissolved in a solvent are mixed together in the presence of water. The resultant mixed solution is then held at a predetermined temperature for a predetermined period to cause the reaction between the anhydrous ytterbium halide and phosphoric acid (mixing and heating reaction). Thus, ytterbium phosphate fine particles are generated. These generated fine particles can be isolated as precipitate by a process such as centrifugal separation. The water can be added to the second mixture solution before the first and second mixture solutions are mixed together to cause the reaction.

In the first embodiment, the reaction between an anhydrous ytterbium halide and phosphoric acid can be caused in the presence of a phosphate. A phosphate $P(=O)(OR)_3$ functions as a solvent and a surface modifying agent. A phosphate can be used as solvents for both the first mixture solution and the second mixture solution. When the surfaces of generated particles are covered with a phosphate, agglomeration of the particles can be suppressed. Other than a phosphate $P(=O)(OR)_3$, a phosphonate $RP(=O)(OR)_2$, a phosphinate $R_2P$ (═O)OR, or a phosphine oxide $R_3P(═O)$ may also be used as a solvent and surface modifying agent.

In these general formulae, R can be a linear or branched alkyl group including 1 to 20 carbon atoms or a phenyl group. Examples of the phosphate include: trialkyl phosphate, triphenyl phosphate, tricresyl phosphate, octyldiphenyl phosphate, tri-2-ethylhexyl phosphate, tri-n-hexyl phosphate, tri-iso-nonyl phosphate, tricyclohexyl phosphate, tributoxyethyl phosphate, and tri-2-chloroethyl phosphate. Examples of the phosphonate include: dimethylmethyl phosphonate, diethylmethyl phosphonate, diethylethyl phosphonate, bis(2-ethylhexyl)-2-ethylhexyl phosphonate, dimethylphenyl phosphonate, diethylphenyl phosphonate, di-n-octylphenyl phosphonate, and diphenylphenyl phosphonate. Examples of the phosphinate include: methyl-dimethyl phosphinate, ethyl-ethylmethyl phosphinate, butyl-ethylmethyl phosphinate, amyl-ethylmethyl phosphinate, n-butyl-ethylpropyl phosphinate, n-butyl-propylmethyl phosphinate, n-butyl-isobutylmethyl phosphinate, n-butyl-hexylmethyl phosphinate, and methyldiphenyl phosphinate. Examples of the phosphine oxide include: trimethyl phosphine oxide, triethyl phosphine oxide, tripropyl phosphine oxide, tributyl phosphine oxide, tripentyl phosphine oxide, trihexyl phosphine oxide, triheptyl phosphine oxide, trioctyl phosphine oxide, trinonyl phosphine oxide, tridecyl phosphine oxide, triphenyl phosphine oxide, and tritolyl phosphine oxide.

In the first embodiment, the reaction between an anhydrous ytterbium halide and phosphoric acid can be caused in the presence of an amine. Such an amine can be added to the second mixture solution. Such an amine typically represented by a tertiary amine $R_3N$ functions as a catalyst and pH adjusting agent. Other than a tertiary amine $R_3N$, a secondary amine $R_2NH$ or a primary amine $RNH_2$ is also usable.

In these general formulae, R can be a linear or branched alkyl group including 1 to 20 carbon atoms or a phenyl group. Examples of the primary amine include alkylamines such as methylamine and ethylamine. Examples of the secondary amine include dialkylamines such as dimethylamine and diethylamine. Examples of the tertiary amine include trialkylamines such as trimethylamine and triethylamine.

Addition of water to a phosphate $P(═O)(OR)_3$ mixture solution (the second mixture solution) in which phosphoric acid has been dissolved is desirable compared with addition of water to a phosphate $P(═O)(OR)_3$ mixture solution (the first mixture solution) in which ytterbium trichloride ($YbCl_3$) has been dissolved. As described above, addition of water in such a manner is performed for the purpose of promoting the dissociation of phosphoric acid using water or for the purpose of sufficiently dissolving ytterbium trichloride ($YbCl_3$) in a phosphate $P(═O)(OR)_3$.

When the reaction period is too short, unreacted substances may remain. Accordingly, the reaction period can be 20 hours or more and 80 hours or less. When the temperature of the reaction solution is too low, the reaction takes a long period of time to proceed. Accordingly, the temperature of the reaction solution can be 100° C. or more. However, when the temperature of the reaction solution is 213° C. or more, phosphoric acid is decomposed. Accordingly, the temperature of the reaction solution can be less than 213° C.

By dispersing ytterbium phosphate ($YbPO_4$) fine particles produced by the production method according to the first embodiment in a polar solvent, a nonpolar solvent, or a monomer, a dispersion solution of the particles can be prepared.

Second Embodiment

Method for Producing Optical Parts

A method for producing optical parts including a step of dispersing ytterbium phosphate fine particles produced in accordance with the first embodiment in an organic material; and a step of curing and shaping the organic material is also provided. A transparent organic-inorganic composite material can be obtained by using a monomer dispersion solution containing ytterbium phosphate fine particles produced by the production method according to the first embodiment and polymerizing the monomer with light or heat to cure the monomer. By processing the composite material into a shape, an optical lens having a high refractive index and a low dispersion (high Abbe number) can be produced. Alternatively, a transparent organic-inorganic composite material can be obtained by dispersing ytterbium phosphate fine particles in a thermoplastic resin. By processing the composite material into a shape, an optical lens having characteristics similar to those of the above-described optical lens can also be produced. Examples of optical lenses that can be produced by the second embodiment include: concave lenses, convex lenses, spherical lenses, aspherical lenses, diffractive optical elements (DOE), and gradient index (GRIN) lenses. These optical lenses can be used for film cameras, digital still cameras (DSC), video cameras (VD), cellular phone cameras, monitoring cameras, TV cameras, movie cameras, and projectors.

Third Embodiment

Method for Producing Ytterbium Phosphate Fine Particles Having Crystallite Size of 3 Nm or More And 10 Nm or Less The third embodiment relates to a method for producing ytterbium phosphate fine particles having a crystallite size of 3 nm or more and 10 nm or less. Specifically, the method includes a step of adding phosphoric acid and water to an anhydrous ytterbium halide; and the molar ratio of the water to the anhydrous ytterbium halide is 1 or more and 20 or less.

Fourth Embodiment

Method for Adjusting Crystallite Size of Ytterbium Phosphate Fine Particles

The fourth embodiment relates to a method for adjusting the crystallite size of ytterbium phosphate fine particles. Specifically, the method includes a step of adding phosphoric acid and water to an anhydrous ytterbium halide; and the crystallite size of ytterbium phosphate fine particles is adjusted by changing the amount of the water added with respect to the anhydrous ytterbium halide.

EXAMPLES

Example 1

A mixture solution A was prepared by dissolving 13.97 g (50 mmol) of anhydrous ytterbium trichloride ($YbCl_3$, purity: 99.9%) in 300 mL of tris(2-ethylhexyl)phosphate in a four-neck flask. A mixture solution B was prepared by dissolving 4.90 g (50 mmol) of crystalline phosphoric acid (purity: 99.9%) and 0.9 g of water (50 mmol, the molar ratio of water to ytterbium trichloride $H_2O/YbCl_3=1$) in 53.05 g (150 mmol) of trioctylamine and 150 mL of tris(2-ethylhexyl) phosphate. The mixture solution A was mixed with the mixture solution B and the flask was purged with argon. While being stirred with a magnetic stirrer, the resultant solution was heated with a mantle heater set at 220° C. for 40 hours. The maximum temperature of the reaction solution was 202°

C. After the reaction solution was cooled, the reaction solution was poured into methanol and a precipitate was isolated by centrifugal separation. After the precipitate was dispersed in and washed with methanol, the precipitate was isolated by centrifugal separation. The precipitate was dried at room temperature under reduced pressure to provide a residue. This residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 4.8 nm with the Debye-Scherrer formula.

Example 2

Mixture solutions A and B were prepared as in EXAMPLE 1. The mixture solution A was mixed with the mixture solution B and the flask was purged with argon. While being stirred with a magnetic stirrer, the resultant solution was heated with a mantle heater set at 220° C. for 80 hours. The maximum temperature of the reaction solution was 202° C. A residue was obtained in the same manner as in EXAMPLE 1. This residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 5.0 nm with the Debye-Scherrer formula.

Example 3

A mixture solution A was prepared as in EXAMPLE 1. A mixture solution B was prepared by dissolving 4.90 g (50 mmol) of crystalline phosphoric acid (purity: 99.9%) and 2.7 g of water (150 mmol, the molar ratio of water to ytterbium trichloride $H_2O/YbCl_3=3$) in 53.05 g (150 mmol) of trioctylamine and 150 mL of tris(2-ethylhexyl)phosphate. The mixture solution A was mixed with the mixture solution B and the flask was purged with argon. While being stirred with a magnetic stirrer, the resultant solution was heated with a mantle heater set at 220° C. for 20 hours. The maximum temperature of the reaction solution was 188° C. The following process was performed as in EXAMPLE 1. The resultant residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 4.8 nm with the Debye-Scherrer formula.

Example 4

The same process as in EXAMPLE 3 was performed except that the heating period was made 40 hours. The maximum temperature of the reaction solution was 188° C. The following process was performed as in EXAMPLE 3. The resultant residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 4.9 nm with the Debye-Scherrer formula.

Example 5

The same process as in EXAMPLE 3 was performed except that the heating period was made 80 hours. The maximum temperature of the reaction solution was 188° C. The following process was performed as in EXAMPLE 3. The resultant residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 5.2 nm with the Debye-Scherrer formula.

Example 6

A mixture solution A was prepared as in EXAMPLE 1. A mixture solution B was prepared by dissolving 4.90 g (50 mmol) of crystalline phosphoric acid (purity: 99.9%) and 5.4 g of water (300 mmol, the molar ratio of water to ytterbium trichloride $H_2O/YbCl_3=6$) in 53.05 g (150 mmol) of trioctylamine and 150 mL of tris(2-ethylhexyl)phosphate. The mixture solution A was mixed with the mixture solution B and the flask was purged with argon. While being stirred with a magnetic stirrer, the resultant solution was heated with a mantle heater set at 220° C. for 40 hours. The maximum temperature of the reaction solution was 180° C. The following process was performed as in EXAMPLE 1. The resultant residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 5.7 nm with the Debye-Scherrer formula.

Example 7

The same process as in EXAMPLE 6 was performed except that the heating period was made 80 hours. The maximum temperature of the reaction solution was 180° C. The following process was performed as in EXAMPLE 6. The resultant residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 5.7 nm with the Debye-Scherrer formula.

Example 8

A mixture solution A was prepared as in EXAMPLE 1. A mixture solution B was prepared by dissolving 4.90 g (50 mmol) of crystalline phosphoric acid (purity: 99.9%) and 7.2 g of water (400 mmol, the molar ratio of water to ytterbium trichloride $H_2O/YbCl_3=8$) in 53.05 g (150 mmol) of trioctylamine and 150 mL of tris(2-ethylhexyl)phosphate. The mixture solution A was mixed with the mixture solution B and the flask was purged with argon. While being stirred with a magnetic stirrer, the resultant solution was heated with a mantle heater set at 220° C. for 40 hours. The maximum temperature of the reaction solution was 175° C. The following process was performed as in EXAMPLE 1. The resultant residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 6.5 nm with the Debye-Scherrer formula.

Example 9

A mixture solution A was prepared as in EXAMPLE 1. A mixture solution B was prepared by dissolving 4.90 g (50 mmol) of crystalline phosphoric acid (purity: 99.9%) and 10.8 g of water (600 mmol, the molar ratio of water to ytterbium trichloride $H_2O/YbCl_3=12$) in 53.05 g (150 mmol) of trioctylamine and 150 mL of tris(2-ethylhexyl)phosphate. The mixture solution A was mixed with the mixture solution B and the flask was purged with argon. While being stirred with a magnetic stirrer, the resultant solution was heated with a mantle heater set at 220° C. for 40 hours. The maximum temperature of the reaction solution was 145° C. The following process was performed as in EXAMPLE 1. The resultant residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 7.7 nm with the Debye-Scherrer formula.

Example 10

A mixture solution A was prepared as in EXAMPLE 1. A mixture solution B was prepared by dissolving 4.90 g (50 mmol) of crystalline phosphoric acid (purity: 99.9%) and 18.0 g of water (1000 mmol, the molar ratio of water to ytterbium trichloride $H_2O/YbCl_3=20$) in 53.05 g (150 mmol) of trioctylamine and 150 mL of tris(2-ethylhexyl)phosphate. The mixture solution A was mixed with the mixture solution B and the flask was purged with argon. While being stirred with a magnetic stirrer, the resultant solution was heated with a mantle heater set at 220° C. for 40 hours. The maximum temperature of the reaction solution was 163° C. The following process was performed as in EXAMPLE 1. The resultant residue serving as a measurement sample was subjected to XRD measurement. The thus-obtained X-ray diffraction pattern showed that this sample was xenotime ytterbium phosphate ($YbPO_4$, PDF#45-0530). The crystallite size of the xenotime ytterbium phosphate at the (200) plane was found to be 8.4 nm with the Debye-Scherrer formula.

Comparative Example 1

A mixture solution A was prepared by dissolving 13.97 g (50 mmol) of anhydrous ytterbium trichloride ($YbCl_3$, purity: 99.9%) in 300 mL of tris(2-ethylhexyl)phosphate in a four-neck flask. A mixture solution B was prepared by dissolving 4.90 g (50 mmol) of crystalline phosphoric acid (purity: 99.9%) in 53.05 g (150 mmol) of trioctylamine and 150 mL of tris(2-ethylhexyl)phosphate. The mixture solution A was mixed with the mixture solution B and the flask was purged with argon. While being stirred with a magnetic stirrer, the resultant solution was heated with a mantle heater set at 220° C. for 40 hours. The maximum temperature of the reaction solution was 192° C. The following process was performed as in EXAMPLES. The resultant residue serving as a measurement sample was subjected to XRD measurement. The thus-obtained X-ray diffraction pattern showed a halo peak and xenotime ytterbium phosphate ($YbPO_4$, PDF#45-0530) was not observed.

Comparative Example 2

The same process as in COMPARATIVE EXAMPLE 1 was performed except that the heating period was made 80 hours. The maximum temperature of the reaction solution was 192° C. The following process was performed as in COMPARATIVE EXAMPLE 1. The resultant residue serving as a measurement sample was subjected to XRD measurement. The thus-obtained X-ray diffraction pattern showed a halo peak and xenotime ytterbium phosphate ($YbPO_4$, PDF#45-0530) was not observed.

The experimental conditions and the experimental results of EXAMPLES and COMPARATIVE EXAMPLES are summarized in Table 1 below.

TABLE 1

| | $YbCl_3$ (mmol) | $H_2O$ (mmol) | Molar ratio $H_2O/YbCl_3$ | Reaction period (hour) | Crystallizability[1] | Crystallite size[2] (nm) |
|---|---|---|---|---|---|---|
| Example 1 | 50 | 50 | 1 | 40 | Good | 4.8 |
| Example 2 | 50 | 50 | 1 | 80 | Good | 5.0 |
| Example 3 | 50 | 150 | 3 | 20 | Good | 4.8 |
| Example 4 | 50 | 150 | 3 | 40 | Good | 4.9 |
| Example 5 | 50 | 150 | 3 | 80 | Good | 5.2 |
| Example 6 | 50 | 300 | 6 | 40 | Good | 5.7 |
| Example 7 | 50 | 300 | 6 | 80 | Good | 5.7 |
| Example 8 | 50 | 400 | 8 | 40 | Good | 6.5 |
| Example 9 | 50 | 600 | 12 | 40 | Good | 7.7 |
| Example 10 | 50 | 1000 | 20 | 40 | Good | 8.4 |
| Comparative example 1 | 50 | 0 | 0 | 40 | Poor | — |
| Comparative example 2 | 50 | 0 | 0 | 80 | Poor | — |

1) Crystallizability: X-ray diffraction patterns were inspected to determine whether the peak of xenotime ytterbium phosphate ($YbPO_4$, PDF#45-0530) was present or not; and whether crystallizable (Good) or not (Poor) was determined.
2) Crystallite size: The crystallite size $D_{(200)}$ of xenotime ytterbium phosphate at the (200) plane was calculated from an X-ray diffraction peak ($2\theta=26.1°$ with the Debye-Scherrer formula (Formula (8)). For calculating the crystallite size, a powder X-ray diffraction pattern integrated analysis software (trade name: JADE, manufactured by Rigaku Corporation) was used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-179635 filed Jul. 31, 2009, which is hereby incorporated by reference herein in its entirety.

What is claimed is:

1. A method for producing ytterbium phosphate fine particles, the method comprising:
adding phosphoric acid and water to an anhydrous ytterbium halide to cause a reaction between the anhydrous ytterbium halide and the phosphoric acid,
wherein a molar ratio of the water to the anhydrous ytterbium halide is 1 or more and 20 or less.

2. The method according to claim 1, wherein the reaction is caused in the presence of a phosphate.

3. The method according to claim 1, wherein the reaction is caused in the presence of an amine.

4. The method according to claim 1, wherein the reaction is caused in the presence of a trialkyl phosphate including a linear or branched alkyl group including 1 to 20 carbon atoms.

5. The method according to claim 1, wherein the reaction is caused in the presence of a trialkyl amine including a linear or branched alkyl group including 1 to 20 carbon atoms.

6. A method for producing ytterbium phosphate fine particles, the method comprising:
   mixing and heating a mixture solution of anhydrous ytterbium trichloride in tris(2-ethylhexyl)phosphate and a mixture solution of phosphoric acid, water, and trioctylamine in tris(2-ethylhexyl)phosphate to cause a reaction between the anhydrous ytterbium trichloride and the phosphoric acid.

7. A method for producing ytterbium phosphate fine particles having a crystallite size of 3 nm or more and 10 nm or less, the method comprising:
   adding phosphoric acid and water to an anhydrous ytterbium halide,
   wherein a molar ratio of the water to the anhydrous ytterbium halide is 1 or more and 20 or less.

8. A method for adjusting a crystallite size of ytterbium phosphate fine particles, the method comprising:
   adding phosphoric acid and water to an anhydrous ytterbium halide,
   wherein a crystallite size of ytterbium phosphate fine particles is adjusted by changing an amount of the water added with respect to the anhydrous ytterbium halide.

9. The method for producing ytterbium phosphate fine particles according to claim 1, wherein the adding is a step to add a mixture of the phosphoric acid and the water to the anhydrous ytterbium halide.

10. The method for producing ytterbium phosphate fine particles according to claim 9, wherein the anhydrous ytterbium halide is dissolved in tris (2-ethylhexyl)phosphate.

11. The method for producing ytterbium phosphate fine particles according to claim 1, wherein the anhydrous ytterbium halide is anhydrous ytterbium trichloride.

12. The method for producing ytterbium phosphate fine particles according to claim 1, wherein a molar ratio of the water to the anhydrous ytterbium halide is 1 or more and 3 or less.

* * * * *